United States Patent [19]

Sugie et al.

[11] 4,300,928
[45] Nov. 17, 1981

[54] STRUCTURE FOR SUPPORTING AIR FILTER

[75] Inventors: Hiromichi Sugie, Nagoya; Hajime Akado, Anjo; Akira Yamashita, Kariya; Yasuhiko Nakamura, Toyohashi, all of Japan

[73] Assignee: Nippondenso Co., Ltd., Kariya, Japan

[21] Appl. No.: 146,249

[22] Filed: May 5, 1980

[30] Foreign Application Priority Data

May 18, 1979 [JP] Japan .................................. 54-66984

[51] Int. Cl.³ ............................................ B01D 46/00
[52] U.S. Cl. .................................... 55/385 R; 55/502; 55/507; 55/510; 55/DIG. 28; 181/207; 248/632
[58] Field of Search ................. 55/DIG. 28, 498, 510, 55/507, 502, 276, 385 R; 248/632; 181/207 123/195 R; 195 A

[56] References Cited

U.S. PATENT DOCUMENTS 2,520,757  8/1950  Cain ..................................... 248/632
3,376,890  4/1968  Hanson et al. ..................... 55/510 X

FOREIGN PATENT DOCUMENTS 52-65368  5/1977  Japan ..................................... 55/510
1013558  12/1965  United Kingdom .................. 55/510
1190231  4/1970  United Kingdom .................. 55/510

OTHER PUBLICATIONS

"Vibration Control", Bulletin No. 104, Lord Mfg. Co., Erie, Pa. 1941.

Primary Examiner—Kathleen J. Prunner
Attorney, Agent, or Firm—Cushman, Darby & Cushman

[57] ABSTRACT

A structure for supporting an air filter on a carburetor, the air filter having a casing accommodating an air filtration element and a cap adapted to close the upper opening of the casing, the cap being adapted to be centered and fixed to the carburetor by a cooperation of a center bolt projecting upward from the carburetor and a butterfly nut. The supporting structure has a supporting member adapted to be fixed to the carburetor, an annular disc-shaped first resilient member connected at its inner periphery to one end of the supporting member and at its outer periphery to the casing of the air filter, and a second resilient member through which the cap of the air filter is fixed to an opposite end of the supporting member. The vibration of the casing and the cap of the air filter is avoided thanks to the first and the second resilient members which insulate the casing and the cap from the vibration caused by the engine to which the air filter is attached.

5 Claims, 4 Drawing Figures

STRUCTURE FOR SUPPORTING AIR FILTER

BACKGROUND OF THE INVENTION

The present invention relates to a supporting structure for supporting an air filter, capable of suppressing as much as possible the transmission of vibration from, for example, an automobile engine to an air filter attached to the engine.

Conventionally, the air filter is attached to a bracket fixed to the engine and also to a carburetor, directly or indirectly through a vibration damping member made of a resilient material such as rubber. If the resilient vibration damping member is used for supporting the casing of the air filter, the transmission of vibration from the engine to the casing is considerably suppressed thanks to the vibration damping effect of the vibration damping member. However, the vibration of the engine body is directly transmitted to the cap of the air filter through a center bolt for centering and fixing the cap. Thus, the cap and the casing of the air filter constitute different vibration systems. If the air filter is mounted solely through a medium of a gasket without the resilient vibration damping member, the vibration is directly transmitted to the air filter from the engine body.

As is well known, the automobile engine is a vibration source which produces vibrations of considerably large amplitudes. The vibration of the engine body, when transmitted to members formed of thin-walled iron plates such as air filter, causes a vibration of these members to produce unfavourable noises. The air filter may be composed of iron plates having greater thicknesses, in order to withstand the vibration transmitted from the engine. In such a case, however, the weight of the air filter as a whole is increased impractically.

It is also possible to interpose, as stated before, a resilient vibration damping member between the casing of the air cleaner and the engine. This, however, cannot overcome the problem of vibration of the air cleaner cap, because the vibration is transmitted to the air filter cap directly from the engine through the center bolt. Thus, noise is inevitably generated by the air filter cap, and, since the cap and the casing of the air cleaner constitute different vibration systems, the cap and the casing are vibrated at different amplitudes and frequencies, adversely affecting the juncture between the cap and the casing, as well as the internal air filtration elements. The vibration suppressing effect on the casing of the air filter, provided by the resilient vibration member made of rubber or the like, will be reduced almost to a half unless an effective measure is taken for suppressing the transmission of vibration to the cap of the air filter.

SUMMARY OF THE INVENTION

It is, therefore, a major object of the invention to overcome the above-described problems of the prior art by providing an improved structure for supporting an air filter.

Namely, an object of the invention is to provide a supporting structure for supporting an air filter capable of suppressing the transmission of vibration from the engine to the air filter, thereby to prevent the generation of noise which is produced secondarily as a result of vibration of the cap and the casing of the air filter.

Another object of the invention is to provide a supporting structure for supporting an air filter, which permits to reduce the wall thickness of the iron plate constituting the air cleaner.

To these ends, according to the invention, there is provided a structure for supporting an air filter on a carrier member of the intake side of an internal combustion engine, the air cleaner having a casing accommodating an air filtration element and a cap adapted to be attached to the casing to close the upper opening of the latter, the cap being adapted to be centered and fixed by a center bolt extending upwardly from the carrier, characterized by comprising: a supporting member adapted to be fixed to the carrier; a first resilient member which is connected at its one end to one end of the supporting member and at its other end to the casing, a portion of the first resilient member being extended to form a seal for providing a seal between the air filter and the carrier; and a second resilient member through which the cap is fixed to the other end of the supporting member.

These and other objects, as well as advantageous features of the invention will become more clear from the following description of the preferred embodiments taken in conjunction with the accompanying drawings.

BRIEF DESCRIPTION OF THE PREFERRED EMBODIMENTS

DESCRIPTION OF THE PREFERRED EMBODIMENTS

Figure 1:
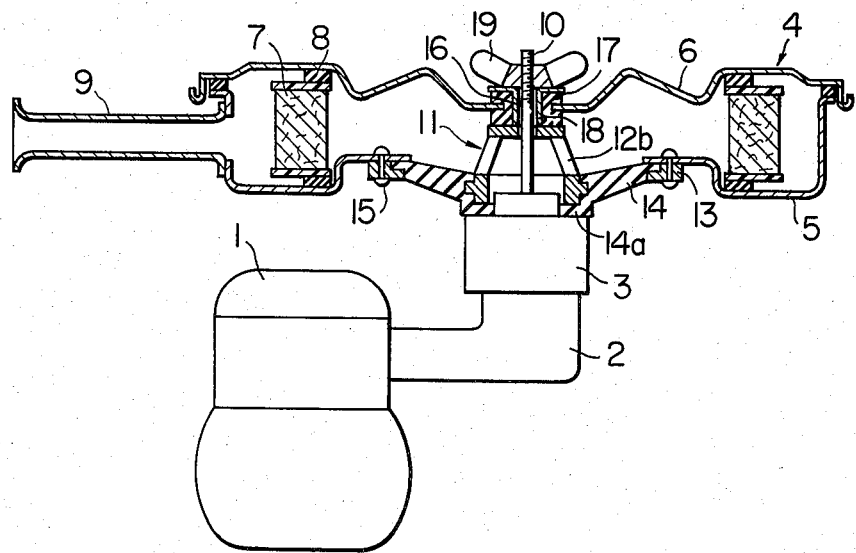
FIG. 1 is a partly sectioned side elevational view of an air filter supporting structure constructed in accordance with an embodiment of the invention.
Figure 2:
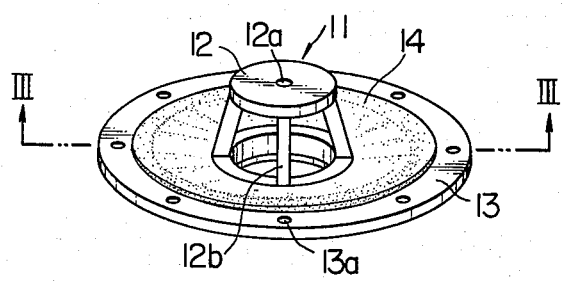
FIG. 2 is a perspective view of a supporting member incorporated in the air filter supporting structure in accordance with the invention.
Figure 3:
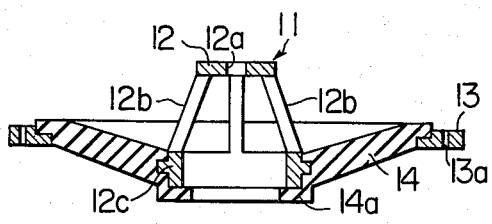
FIG. 3 is a sectional view taken along the line III—III of FIG. 2.
Figure 4:
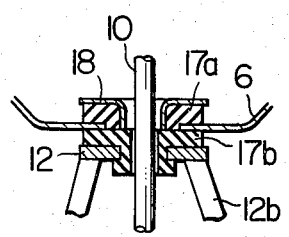
FIG. 4 shows an essential part of another embodiment of the invention.

Referring first to FIGS. 1 to 3 showing a first embodiment of the invention, an internal combustion engine 1 has an intake pipe 2 provided with a carburetor 3 to which attached is an air filter 4. The air filter is composed of a metallic casing 5 and a metallic cap 6 which in combination define a major space therebetween. A reference numeral 7 denotes a ring-shaped air filtration element for cleaning the intake air which is to be supplied to the engine 1. The filtration element 7 is clamped between the case 5 and the cap 6 through the mediums of rubber gaskets 8,8. An air horn 9 made of a metal is fixed to the peripheral wall of the casing 5.

A center bolt 10 fixed beforehand to the carburetor 3 locates the air filter 4 and fixes the same to the carburetor 3 with a wing nut 19. A reference numeral 11 denotes a supporting member for supporting the air filter 4. The supporting member 11 is produced by die casting, and has a disc-shaped portion 12 provided with a central bore 12a for receiving the center bolt 10. The supporting member is also provided with four studs 12b and a bottom ring 12c. A reference numeral 13 denotes a metallic ring plate having a plurality of holes 13a, while a reference numeral 14 denotes a disc-shaped resilient member made of rubber and unitarily connected between the ring plate 13 and the supporting member 11 by means of baking type adhesive or the like.

A portion of the resilient member 14 is extended to an area beneath the supporting member 11, so as to form a seal 14a between the supporting member 11 and the carburetor 3. The ring plate 13 is fixed by means of rivets 15 to a lower portion of the casing 5 in an airtight manner. On the other hand, a ring-shaped resilient member 17 made of rubber is fitted in the central opening 16 which is formed in the cap 6 and adapted to receive the center bolt 10. This resilient member 17 is compressed against the disc-shaped portion 12 of the supporting member 11 as a nut 19 is screwed to the center bolt 10 through the medium of an annular spacer 18 made of a metal.

The tightening force of the nut 19 is limited by the spacer 18 so that the associated members are protected against excessively large tightening force. As the nut 19 is screwed, the seal 14a of the resilient member 14 is compressed to make a tight sealing contact with the carburetor 3 to prevent the leakage of air. The upper end of the resilient member 14 is disposed slightly above the surface of the ring palte 13, so as to make a close contact with the casing 5 without fail.

In operation, as the engine 1 starts to operate, the vibration is transmitted from the engine 1 to the air filter 4 through the intake pipe 2 and the carburetor 3. According to the invention, however, the casing 5 and the cap 6 of the air filter is completely insulated from the engine vibration by means of the resilient member 14 associated with the casing 5 and the resilient member 17 associated with the cap 6, respectively. Therefore, the unfavourable secondary vibrations of the casing 5 and cap 6 of the air filter and, hence, the chatterings of the casing and cap are eliminated.

In addition, since the seal between the casing 5 and the carburetor 3 is performed by the extension 14a of the resilient member 14 associated with the casing 5, it is not necessary to employ additional or specific sealing member. On the other hand, the seal between the cap 6 and the member to which the latter is fixed is presented by the resilient member 17.

Since the air filter 4 as a whole is insulated from the engine vibration as stated above, the mechanical strengths of the case 5 and the cap 6 can be reduced without fear of breakage. This conveniently permits to reduce the thickness of the plate constituting the casing and cap, use of a plastic as the material of the casing and cap or to constitute the casing and cap plates of a metal having smaller specific weight than iron.

In addition, a reinforcement plate for strengthening the juncture between the casing 5 and the air horn 9, bracket for attaching the air filter 4 to the engine 1 or the intake pipe 2 and other parts necessitated in the conventional structures can be eliminated.

The present invention can be embodied in various forms as stated hereinunder.

(1) The supporting plate 11 may be constituted by a plurality of metal plates welded to one another, or may be cast from aluminum or the like. It is also possible to form the supporting member 11 from a plastic having a sufficiently high mechanical strength.

(2) The resilient member 17 associated with the cap 6 may be constituted by an upper member 17a and a lower member 17b which are separable from each other. In assembling, the lower part 17b is fitted to the disc-shaped portion 12 of the supporting member 11, while the upper part 17a is placed removably. It is also possible to form the upper part 17a of the resilient member 17 unitarily with the spacer 18. The same applies also to the embodiment shown in FIG. 1.

(3) The resilient members 14, 17 may be formed of a plastic having a sufficiently high resiliency, such as soft uni-form type polyurethane.

(4) The supporting member 11 may be attached beforehand to the carburetor 3.

(5) The air filter supporting structure of the invention can apply also to the engine having an electric fuel injection system, as well as to diesel engines and other types of engines.

As has been described, according to the invention, there is provided a supporting structure for supporting an air filter on a carrier member such as a carburetor, the supporting structure having a supporting member adapted to be fixed to the carrier member, a first resilient member connected at its one end to the supporting member and connected at its other end to the casing of the air filter, and a second resilient member disposed between the other end of the supporting member and the cap of the air filter.

Therefore, the casing and the cap of the air filter is completely insulated from the engine vibration by the first and the second resilient members, respectively, and the undesirable secondary vibration and, hence, the chattering of the casing and the cap are fairly avoided. Thus, the air cleaner supporting structure of the invention contributes greatly to the suppression of generation of noises.

It is also to be pointed out that, since a portion of the first resilient member attached to one end of the supporting member plays a role of a sealing member for providing a seal between the air filter and the carrier member, and since the clearance between the cap and the associated member is performed by the second resilient member associated with the cap, it is not necessary to use any specific sealing member.

Further, the casing and the cap of the air filter can have reduced mechanical strengths because they are insulated from the vibration of the engine. This permits to reduce the wall thickness of the case and cap or to use light metals, plastics and so forth as the material of the casing and cap of the air filter. In consequence, the weight of the air filter as a whole is conveniently decreased to reduce the fuel consumption of the automobile mounting this air filter supporting structure.

What is claimed is:

1. In a structure for supporting an air filter on a carrier member of the air intake of an internal combustion engine, said air filter having a casing accommodating an air filtration element and being provided with top and bottom openings and a detachable cap to close the top opening, said cap being adapted to be centered and fixed by a center bolt extending upwardly from said carrier member, the improvement in said support structure comprising:

a first disc-like resilient member having a central opening and closing said bottom opening of said casing, the marginal edge portion of said resilient member about said central opening thereof being adapted to intimately contact said carrier member to provide a seal between said air filter and said carrier member;

a metal ring plate attached to the periphery of said resilient member and fixed to said casing about said bottom opening thereof;

a supporting member in said casing having one end thereof fixed to said resilient member about the periphery of said central opening thereof; and a second resilient member secured to said cap and engaging an opposite end of said supporting member.

2. A structure for supporting an air filter as claimed in claim 1, wherein said second resilient member has a substantially flattened and cylindrical form and is fitted and connected to said cap, and wherein the opposite end of said supporting member is in the form of a disc adapted to abut said second resilient member.

3. A structure for supporting an air filter as claimed in any one of claims 1 and 2, characterized by further comprising a rigid spacer engaged with said second resilient member opposite said engagement with said supporting member to suitably limit the resilient deformation of said second resilient member.

4. A structure for supporting an air filter as claimed in claim 1, wherein said second resilient member is constituted by an upper part and a lower part separable from each other, said lower part being attached to said opposite end of said supporting member, while said upper part is detachably secured to said cap.

5. In an air filter having a casing accommodating an air filtration element and provided with top and bottom openings and a detachable cap to close said top opening, said air filter being adapted to be mounted on the intake of a carburetor by cooperation with a centering bolt extending therefrom and a nut on said bolt, the combination of improved structure for supporting said air filter comprising:

a first resilient disc-like member having a central opening and closing said casing bottom opening, said member being fixed to said casing through a metallic ring plate secured to the outer periphery of said member and to said casing about said bottom opening, said member having a sealing portion for making sealing contact with said air intake;

a supporting member including a cylindrical portion, a disc-shaped portion and a plurality of supporting pillars extending between said portions, said cylindrical portion being secured to said first resilient member about said central opening therein;

a second resilient member secured to said cap and engaged with said disc-shaped portion to resiliently support said cap; and a rigid spacer engageable by and between said nut and said disc-shaped portion for limiting the tightening force applied to said second resilient member by said nut.

* * * * *